(12) United States Patent
Carpinetti

(10) Patent No.: US 6,231,704 B1
(45) Date of Patent: May 15, 2001

(54) APPARATUS FOR ON-SITE INSTALLATION OF AIR DUCT SYSTEM

(76) Inventor: David J. Carpinetti, 9 Old Ware Rd., West Brookfield, MA (US) 01585

(\*) Notice: Subject to any disclaimer, the term of this patent is extended or adjusted under 35 U.S.C. 154(b) by 0 days.

(21) Appl. No.: 09/370,762

(22) Filed: Aug. 9, 1999

Related U.S. Application Data (63) Continuation-in-part of application No. 08/892,052, filed on Jul. 14, 1997, now abandoned.

(51) Int. Cl.$^7$ ............................... F24F 7/04; F16L 9/127
(52) U.S. Cl. ................. 156/71; 52/302.3; 285/284.1; 285/424; 138/149; 138/162; 138/DIG. 4
(58) Field of Search .................................... 285/205, 209, 285/284.1, 424; 454/330, 903; 138/DIG. 4, 149, 162; 156/71; 52/302.3

(56) References Cited

U.S. PATENT DOCUMENTS

| | | | |
|---|---|---|---|
| 2,183,174 | * | 12/1939 | Smith . |
| 2,201,312 | * | 5/1940 | Hauser . |
| 3,643,646 | * | 2/1972 | Honaker, Jr. . |
| 3,858,355 | * | 1/1975 | Root . |
| 5,219,403 | * | 6/1993 | Murphy . |

\* cited by examiner

*Primary Examiner*—Sam Chuan Yao
(74) *Attorney, Agent, or Firm*—Thomas A. Kahrl, Esq (57) ABSTRACT

An insulated air duct apparatus including insulated duct modules and associated insulated fitting apparatus for transferring a volume of fluid in a warm air heating and air conditioning installation without employing external insulation or structural support members, otherwise required to support and insulate duct apparatus including a plurality of lightweight duct modules in combination with take-off connectors for joining such modules, each duct module comprising duct walls joined by corner members wherein said duct walls and take-off connectors comprise rigid fibrous glass (RFGB) with reinforced facing having inherent structural strength such that each duct module is self supporting.

7 Claims, 9 Drawing Sheets

APPARATUS FOR ON-SITE INSTALLATION OF AIR DUCT SYSTEM

CROSS REFERENCE TO RELATED APPLICATIONS

This application is a continuation-in-part of U.S. patent application Ser. No. 08/892,052, filed Jul. 14, 1997, now abandoned, entitled Method and Apparatus Employing On-site Forming of Duct System in the name of David J. Carpinetti.

BACKGROUND OF THE INVENTION

1. Field of the Invention (Technical Field)

In the parent application, the invention is directed to methods and apparatus for forming, sizing and interconnecting duct work systems on site, including pre-insulated components and connectors for transporting fluids. More particularly, the invention is a device which combines a flat panel manufactured with an intermediate insulation layer sandwiched between two outside waterproof sheets, take-off apparatuses of two part construction and pre-insulted connector articles including matched transition components adapted to form an insulated duct system sized on-site.

In the present application, the invention is directed to an insulated air duct system for transferring a volume of fluid in a warm air heating and air conditioning system without employing external insulation or structural support members, otherwise required to support and insulate duct apparatus, comprising a plurality of lightweight duct modules in combination with take-off connectors, each formed on-site from rigid fibrous glass board (RFGB) with reinforced facing each duct module comprising structural support means for providing inherent structural strength to each duct module and including one or more insulated fitting devices for coupling air duct system components together.

2. Background Art

There is a well recognized need for ease of forming air duct work on site, particularly duct work requiring insulation installed in residential buildings. Applicant is aware of prior art devices that have attempted to solve this need by employing a duct board of sandwiched construction for constructing ducts.

In U.S. Pat. No. 5,219,403 to Murphy, there is shown a distribution box, and a rectangular duct line having an intermediate foam core sandwiched between inner and outer plastic layers. Corner molding slots are provided to connect two adjacent duct board walls along its length. The limitations of Murphy result from the inherent structural weakness of foam core duct board walls requiring additional exterior structural support resulting in difficult and slow assembly, as well as structurally weak corner joints. Also Murphy does not teach a simple and effective means of joining duct lines, nor internally insulated couplings.

The present invention overcomes the limitations expressed above of the prior technology, by employing the advantageous characteristics of an insulated air duct system comprising a plurality of lightweight, insulated duct modules in combination with take-off connectors, each duct module comprising duct walls joined by corner members with comprising rigid fibrous glass (RFGB) with reinforced facing, formed on-site, having inherent structural strength such that each duct module is self supporting and including one or insulated improved fitting devices for joining duct modules and for coupling insulated components.

SUMMARY OF THE INVENTION

The present invention is directed to an insulated air duct apparatus including insulated duct modules and associated insulated fitting devices for transferring a volume of fluid in a warm air heating and air conditioning installation without employing external insulation or structural support members, otherwise required to support and insulate duct apparatus. In particular the present invention comprises a plurality of lightweight duct modules in combination with take-off devices (transition means) for joining such modules, each duct module comprising duct walls joined by corner members wherein said duct walls and take-off devices (transition means) comprise rigid fibrous glass (RFGB) with reinforced facing having inherent structural strength such that each duct module is self supporting. This invention also includes one or more associated rigid fibrous glass fittings having internal insulation means for coupling air duct system components together. By eliminating duct work components, as provided by prior technology, employing external insulation or structural support members, installation is greatly simplified. The duct apparatus is easy to use as it comprises one or more lightweight duct modules and includes one or more associated insulated fitting devices for joining insulated modules and for coupling insulated components.

Each duct module is made up of four panel members comprising a plurality of duct walls of lightweight rigid fibrous glass (RFGB) with reinforced facing cut to size. These walls are joined together by associated structural corner members of plastic material typically constructed of ABS plastic cut to size for joining adjoining duct walls to form a light weight, rigid, self-supporting duct module. Also provided is a simple method of providing access doors in the duct for permitting access to interior spaces as well as fitting devices permitting fluid to communicate between duct system components.

Also included are insulated fitting devices for connecting said duct module to component members including take off apparatus for associating with said access means for cooperating with an inner facing of a duct wall. The take-off apparatus (transition means) includes two parts, one part female having a flange, one part male having a flange. The female part would be mounted on the inner surface of a duct wall with adhesive means (ABS plastic glue) applied to the inside surface of the flange for contacting the inner facing of the duct wall, and the male part would be mounted on the outer surface of a duct wall with adhesive means (ABS plastic glue applied to the outside). Further included are duct modules comprising secondary duct means including one or more access members for communication with a tubular conduit means.

The invention is further directed to an air duct work system comprising air duct work as well as transition fitting components cut on-site from pre formed sheets of rigid fibrous glass board (RFGB) with reinforced facing such as reinforced aluminum foil/kraft (FRK) facing for forming thermally and acoustically insulated air duct system. Such (RFGB) may be used to fabricate on-site air ductwork for heating, cooling and dual temperatures systems operating up to 5,000 FPM, plus or minus 2 inches w.g.(500 Pa) static pressure, 250 degrees F.; (121 degrees C.) internal air temperatures. The Fiberglas duct board has a stiffness defined by flexural rigidity. A duct board of 1½" provides a combination of structural rigidity as well as superior thermal value. In the present invention, panels are cut from a large sheet consisting of pre formed insulated material and connected to pre-insulated components on a construction site. This is a major improvement over the current practice of having sheet metal duct work prepared off-site which must be insulated on site after or during installation.

Further, each transition component connects to a plurality of duct sub systems. Also, connector articles are employed to hold the sides of the duct together along its length. In the specific arrangement of the invention the transition components connect to the main duct by gluing into the edges of the main duct assemblies.

The present invention is also directed to a method of installing an air duct work system including the employing a novel single stage method of constructing air duct work as well as transition fitting components from pre formed sheets of rigid fibrous glass board (RFGB) with reinforced facing such as reinforced aluminum foil/kraft (FRK) facing for forming thermally and acoustically insulated air duct system.

An advantage of the present invention is that access hole locations are no longer critical, as holes are cut into duct after a main trunk is completely installed, whereby a tool can easily cut holes in the top of the duct or in the sides in confined spaces. A further advantage is that duct work hangers do not penetrate the vapor barrier causing sweating of exposed metal parts in the cooling mode. Yet a further advantage is that all duct work insulation is completely sealed against moisture and fiberglass fibers cannot become airborne within the duct, unlike metal duct or duct board.

Accordingly, the object and purpose of the present invention is to provide for a plurality of lightweight duct modules, each duct module comprising duct walls joined by corner members wherein said duct walls comprise rigid fibrous glass (RFGB) with reinforced facing having inherent structural strength such that each duct module is self supporting and forms a thermally and acoustically insulted air duct system.

Accordingly, the object and purpose of the present invention is to provide for pre-insulated connector articles including matched (RFGB) transition components adapted to form an insulated duct system sized on-site.

A further object of the invention is to provide an enhanced means of interconnecting transition components to duct components on site.

A further object of the present invention is to provide for a novel single stage method of constructing air duct work as well as transition fitting components from performed sheets of rigid fibrous glass board (RFGB) with reinforced facing such as reinforced aluminum foil/kraft (FRK) facing for forming thermally and acoustically insulated air duct system.

The invention will be described for the purposes of illustration only in connection with certain embodiments. However, it is recognized that those persons skilled in the art may make various changes, modifications, improvements and additions on the illustrated embodiments all without departing from the spirit and scope of the invention.

BRIEF DESCRIPTION OF THE DRAWINGS

The accompanying drawings, which are incorporated into and form a part of the specification, illustrate several embodiments of the present invention and together with the description serve to explain the principals of the invention. The drawings are only for the purpose of illustrating a preferred embodiment of the invention and are not construed as limiting the invention.

FIG. 3b is an exploded view of FIG. 3a.

FIG. 7a is an exploded view of the locking device of FIG. 6a.

FIG. 7b is an insulated duct detail of the locking device of FIG. 7a.

FIGS. 16a, b and c shows the insulated end boot of FIG. 15a shown UN-insulated.

DETAILED DESCRIPTION OF THE PREFERRED EMBODIMENT

Figure 1:
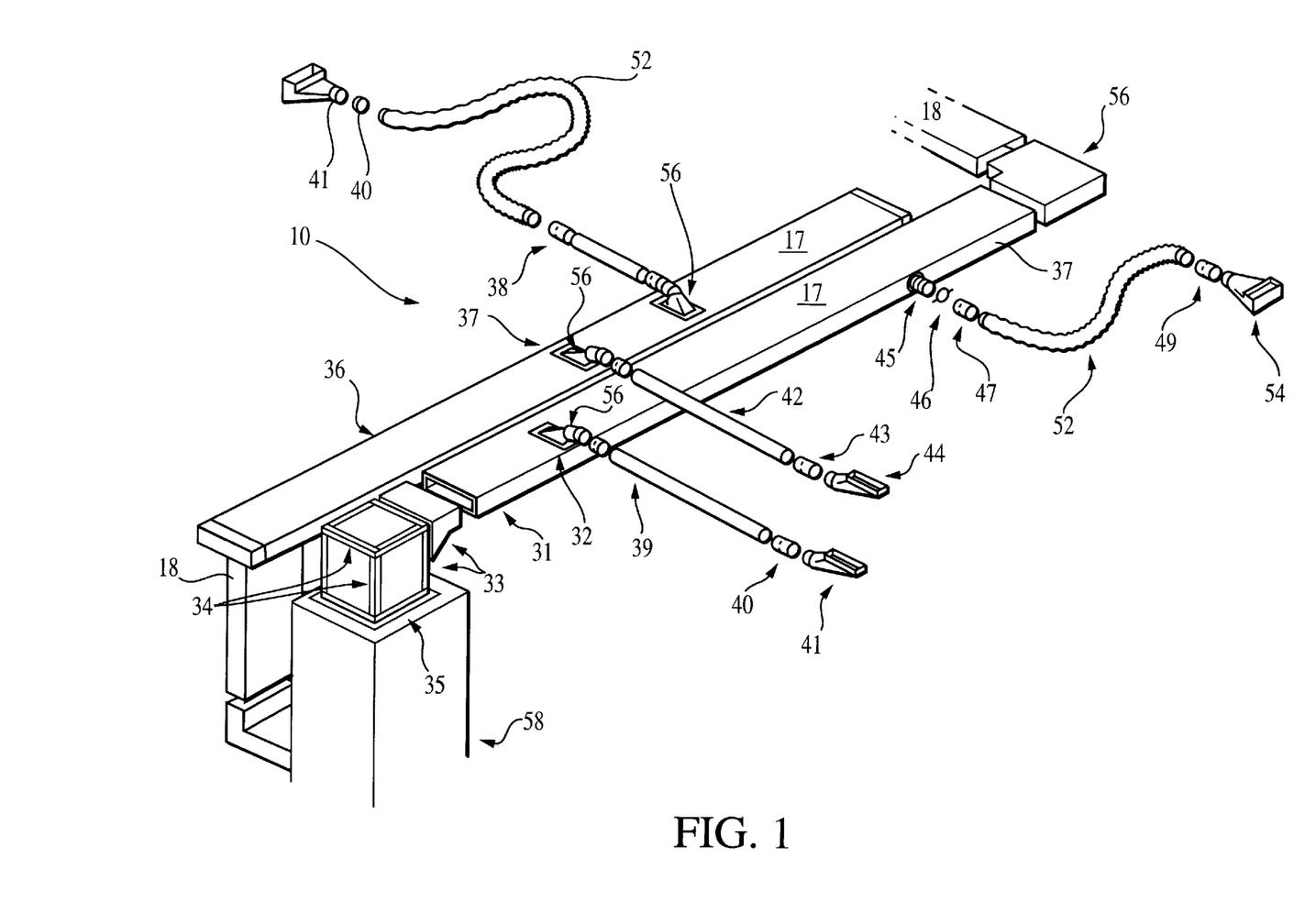
FIG. 1 is a schematic representation illustrating the insulated air duct system comprising a plurality of lightweight duct modules in combination with take-off connectors (transition means) each formed on-site from rigid fibrous glass board (RFGB) with reinforced facing each duct module comprising structural support means for providing inherent structural strength to each duct module.
Figure 7A:
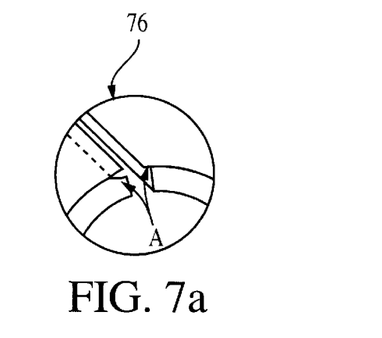
Figure 7B:
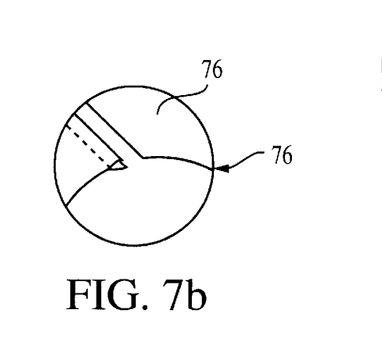
Figure 8:
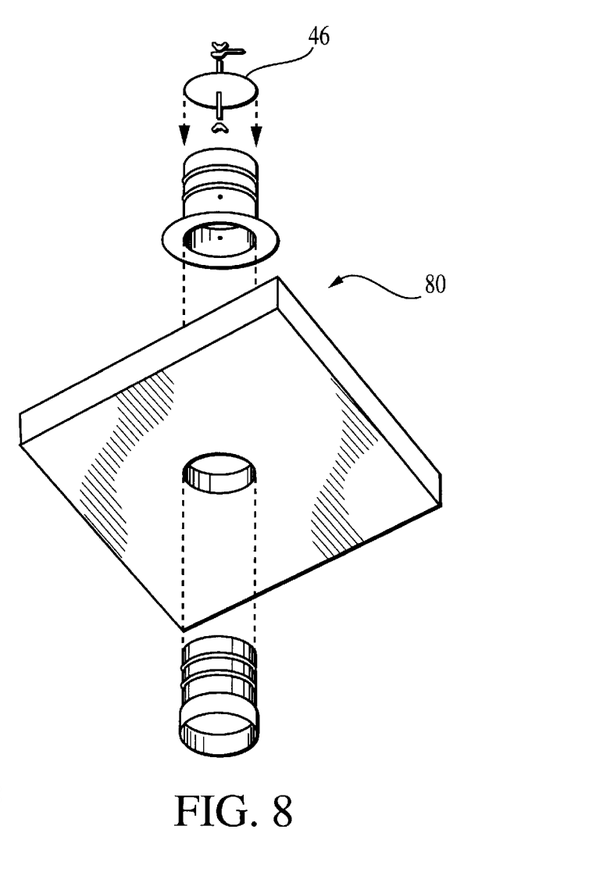
FIG. 8 is a perspective view shown partially exploded of round take-off of the invention of FIG. 1.
Figure 9:
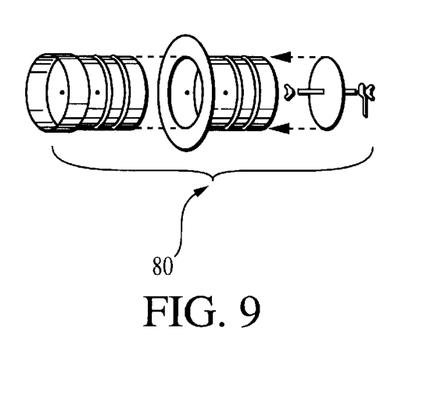
FIG. 9 is an exploded view of FIG. 8.
Figures 10, 11:
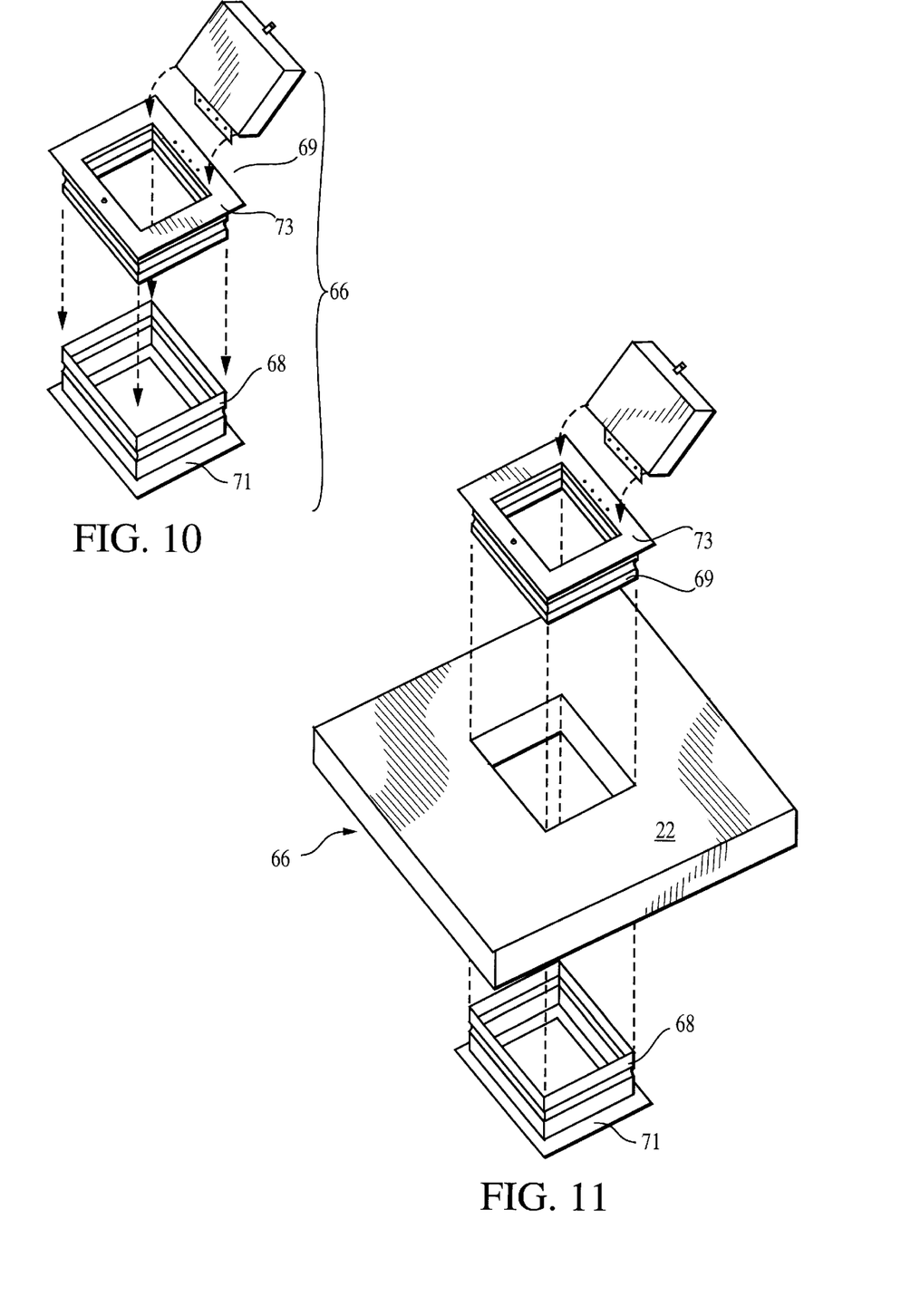
FIG. 10 is an exploded view of an insulated access door of the invention of FIG. 1.
FIG. 11 is an exploded view of an insulated access door of FIG. 10 shown in combination with a main trunk line panel.

Referring to FIGS. 1–22d there is shown the preferred embodiment of the present invention. As is shown in FIGS. 1, 8 & 10 the preferred embodiment comprises an insulated air duct apparatus 10 including insulated duct modules 17 and a plurality of transition components 56, (transition means) including two parts, one part female 68 having a flange 71, one part male having a flange 73. Also included is an insulated access door 66, (access means) shown in FIG. 10 including two parts, one part female 68 having a flange 71, one part male having a flange 73, and at least one take-off 80 (transition means) shown in FIGS. 8 & 9, for transferring a volume of fluid in said duct apparatus 10 without employing external insulation or structural support members, otherwise required to support and insulate such a duct apparatus.

In particular the present invention comprises a plurality of lightweight duct modules 17, each duct module comprising duct walls consisting of duct panels 22 joined by corner connectors 25 wherein said duct panels and transition components 56 comprise insulation layer 16 comprising fibrous glass (RFGB) 16. Said duct panels also comprise reinforced facing 14 having inherent structural strength such that each duct module 17 is self supporting. Said invention also includes one or more associated take-off connectors 21, (transition means) each comprising a rigid fibrous glass fitting having internal insulation means for coupling air duct system components together. A connector 25, shown in FIG. 3b holds a first duct panel 22 to a second duct panel 22 together lengthwise. The panels 22 are constructed from the large sheet 12 insulated material and cut on location to form the insulated air duct apparatus 10.

As is shown in FIG. 1, the air duct apparatus 10 consists of main duct assemblies 37 consisting of a lightweight duct module 17 and a plurality of transition components 56. Each transition component 56 connects a to duct board panel 22 of the main duct assembly 37. In the specific arrangement of the invention, the transition components 21 connect to a selected duct board panel 22 by gluing into the edges 26 of said duct 18.

Figure 2:
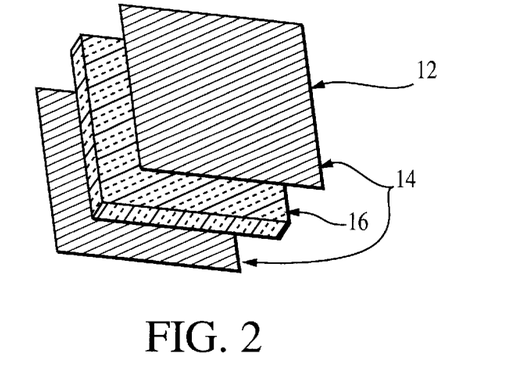
FIG. 2 is an exploded view in perspective of a panel of rigid fibrous glass board (RFGB) insulation means sandwiched between two sheets of reinforced facing material of the invention of FIG. 1.
Figure 3A:
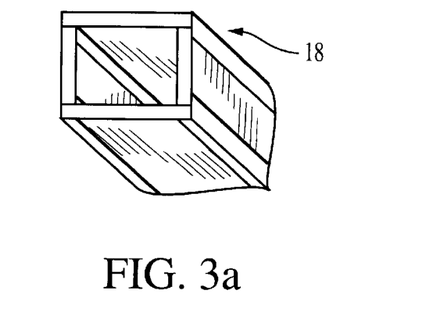
FIG. 3a is an end view in perspective of a duct of the invention of FIG. 1.
Figure 3B:
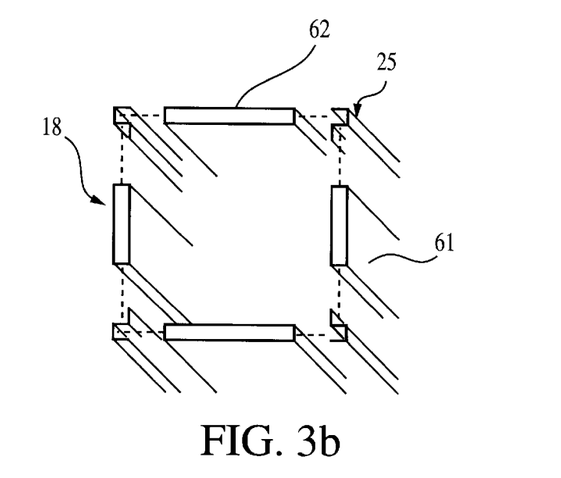

As is shown in FIG. 1, a connector system 30 employed with the air duct apparatus 10 of the present invention includes supply trunk line 31, adjustable take off 32, field fabricated supply plenum 33 used as a take off assembly, extruded corner member 34, and mounting flange 35, UN-insulated return duct trunk line 36, UN-insulated take-off 37, (transition means), insulated round duct coupling 38, insulated round duct 39, insulated round duct coupling 40, 43, 47, 49, insulated end boot 41, UN-insulated round duct 42, UN-insulated end boot 44, round take off collar 45 for insulated or UN-insulated round duct 50, volume damper 46, typical insulated flex duct 52 found in use in the field today, insulated angle boot 54, and field fabricated 90 degree turn 56. This is shown in FIG. 1, typical hot air furnace 58. Referring to FIG. 2, there is shown panel 60 constructed typically of ABS (acrylonitrile-butandiene-styrene) sheets 14, (having a thickness of ⅛" (0.0625"), typical rigid fiberglass) an insulation layer 16, having a thickness of 1". Referring to FIG. 3 there is shown panel members 62 and 61 of duct precut on site in blowup. Also shown is the double right angle 25 used to connect said duct panel members 61–62 into an assembled duct 18 having a rectangular cross section.

Figure 4A:
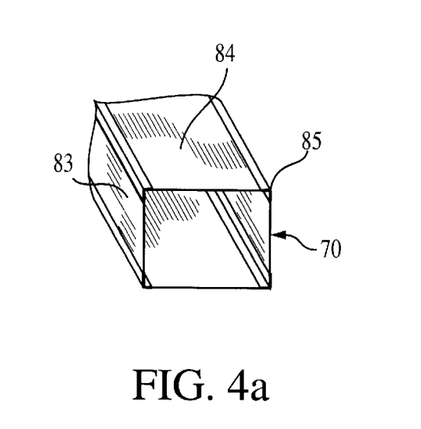
FIG. 4a is an end view in perspective of an UN-insulated duct for use with the invention of FIG. 1.
Figure 4B:
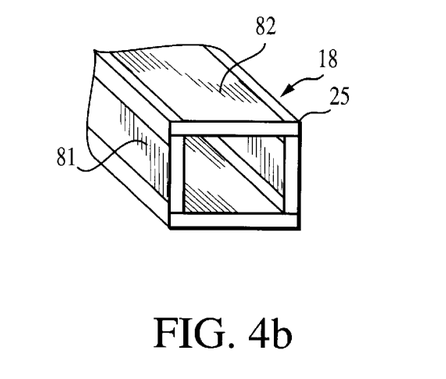
FIG. 4b is an end view in perspective of an insulated duct module of the invention of the invention of FIG. 1.
Figure 5:
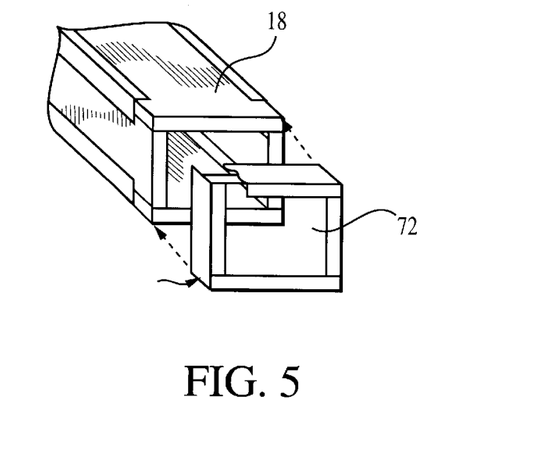
FIG. 5 is an end view in perspective, shown partially exploded, of an end cap of the invention of FIG. 1.

There is shown in FIG. 4a an example of an assembled UN-insulated duct 70 having major panel members 84, and minor panel members 83 and corner member 85. As shown in FIG. 4b is an assembled insulated duct 18 having major panel members 82, and minor panel members 81 and corner members 25. As shown in FIG. 5 is assembled end cap 72 spaced apart from insulated duct 18.

Figure 6A:
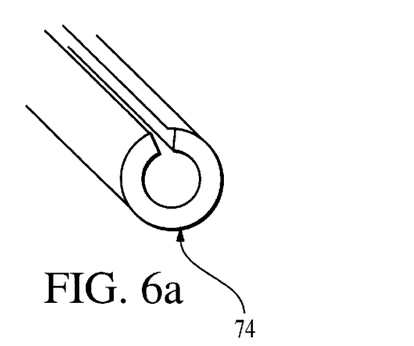
FIG. 6a is an end view of a tubular duct of the invention of FIG. 1 shown in an unlocked open position.
Figure 6B:
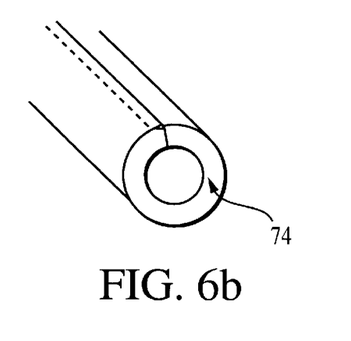
FIG. 6b is an end view in perspective of a tubular duct work of FIG. 6a shown in a locked position.

There is shown in FIG. 6a an end view of tubular insulated duct 74 in unlocked position and in FIG. 6b in a locked position. Referring to FIG. 7a there is shown a detail of an insulated tubular duct 74 detail of locking device 76 and UN-insulated duct 78 of locking device 76. Referring to FIG. 8, the preferred embodiment shows two halves of round take off 80 being installed into the side of the duct panel 22. Also shown is the volume damper 46. Referring to FIG. 9, there is shown an exploded view of round take-off 80 (transition means). In FIG. 10 is shown a blowup of an insulated access door assembly 66, (access means) and FIG. 11 shows said insulated access door (access means) assembly 66 being installed in the main trunk line of the insulated duct 18.

Figure 12A:
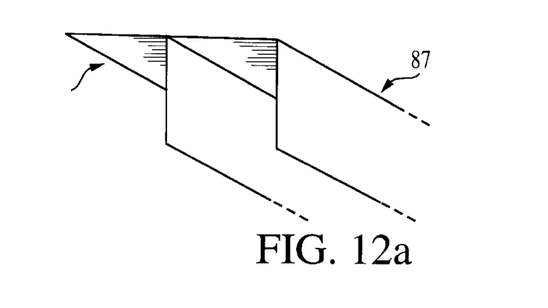
FIGS. 12a through 12h shows an assortment of angle connectors for duct work of the invention of FIG. 1.
Figure 12B:
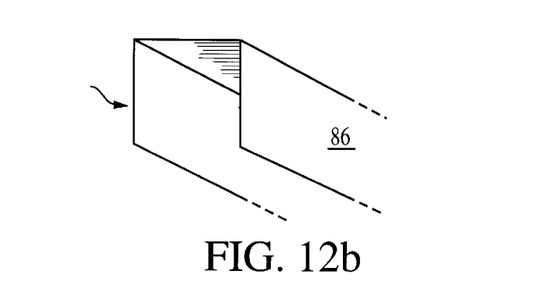
Figure 12C:
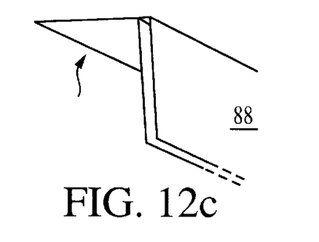
Figure 12D:
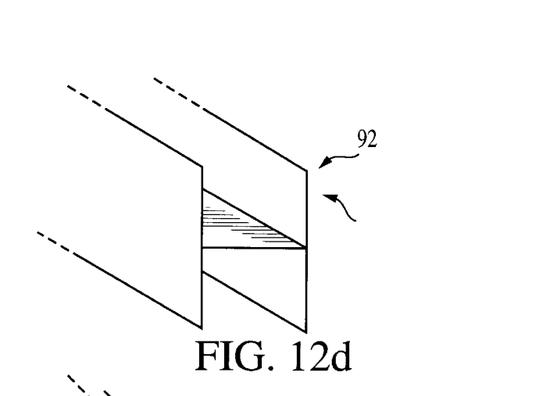
Figure 12E:
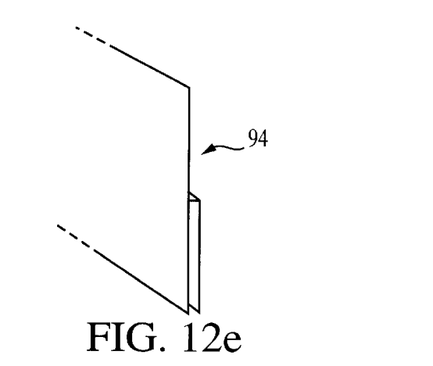
Figure 12F:
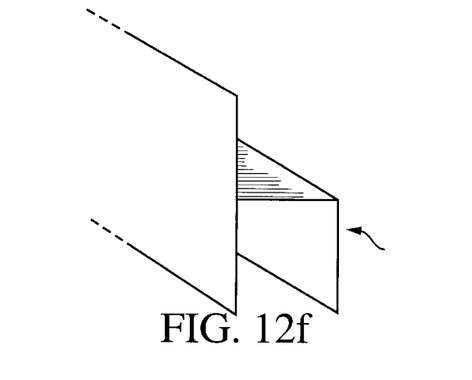
Figure 12G:
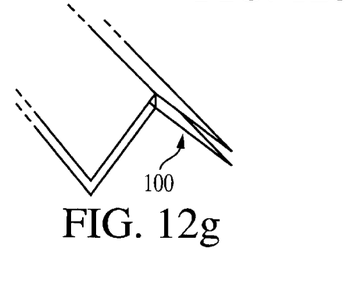
Figure 12H:
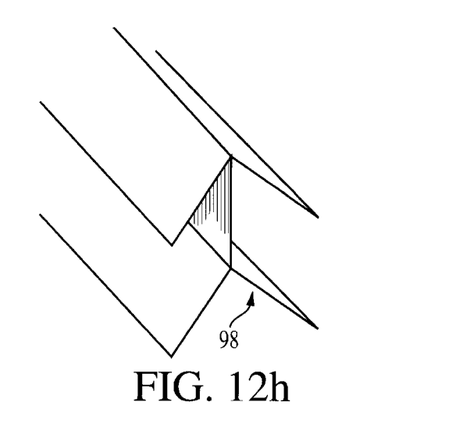

Referring to FIGS. 12a–h, there is shown an assortment of extruded ABS plastic corner members 85 employed to assemble UN-insulated duct such as is shown in FIG. 4a. As shown in FIG. 12a is flange 87 to attach insulated duct 18 to furnace 58, referring to FIG. 12b end cap 86 is employed to cover a cut end of duct 18. Referring to FIG. 12c, plastic flange 88 is employed to attach UN-insulated duct 70 to furnace 58. Referring to FIG. 12c, flange 90 is employed to attach duct 18 to furnace 58. Referring to FIG. 12d, coupling 92 is employed to attach 2 sections of duct 18 together, and referring to FIG. 12e extruded 45 degree angle 94 is employed to make the edges of an insulated, field-fabricated offset fitting 96. Also shown in FIGS. 12g and 12h is extruded ABS plastic 45 degree angle 98 employed to make the edges of an UN-insulated field fabricated offset or reducing fitting 100.

Figure 13A:
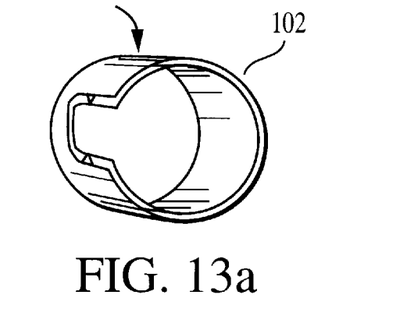
FIG. 13a is an UN-insulated ABS plastic coupling joining two pieces of UN-insulated duct together for use with the invention of FIG. 1.
Figure 13B:
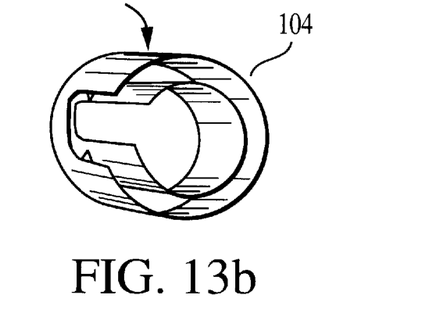
FIG. 13b is an ABS plastic coupling used to join two insulated tubular duct together of the invention of FIG. 1.
Figure 14A:
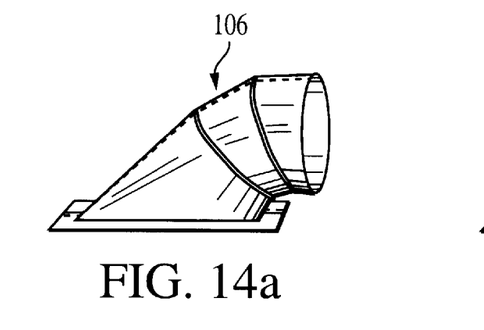
FIGS. 14a and b show an UN-insulated take off in the exploded view and assembled view for use with the invention of FIG. 1.
Figure 14B:
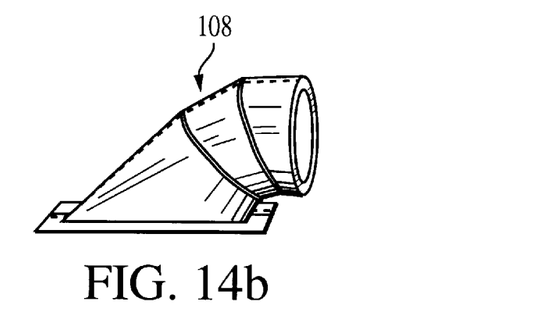
Figure 14C:
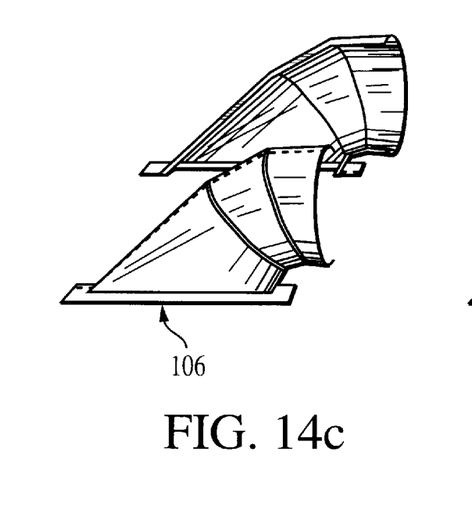
FIGS. 14c and d show an insulated take off in an assembled and unassembled view of the invention of FIG. 1.
Figure 14D:
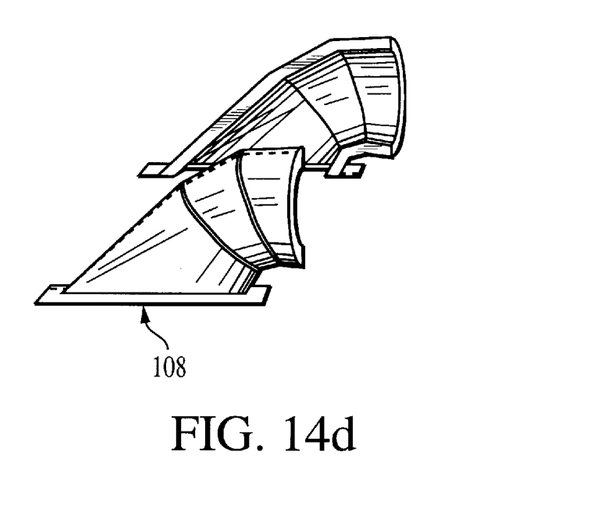
Figures 15A, 15B, 15C:
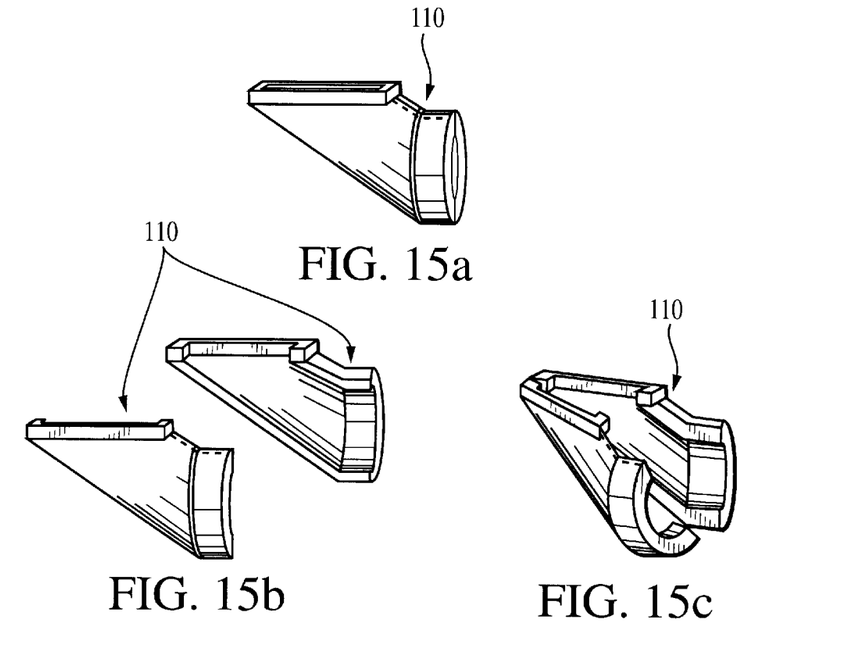
FIG. 15a is a perspective view of an insulated end boot of the invention of FIG. 1.
FIG. 15b shows the boot of FIG. 15a exploded.
FIG. 15c shows the boot of FIG. 15a having a hinge at the back for ease of manufacture and shipping.
Figures 16A, 16B, 16C:
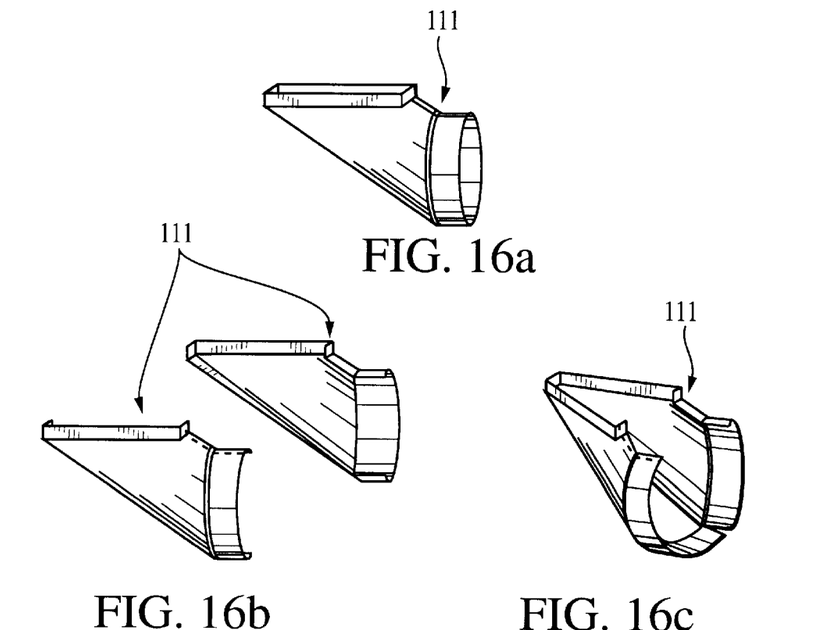
Figure 17A:
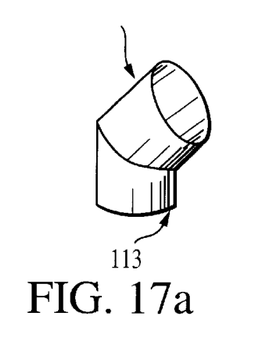
FIGS. 17a, b and c is an UN-insulated 45 degree elbow shown fully assembled, shown in two halves and shown hinged at the back for use with the invention of FIG. 1.
Figure 17B:
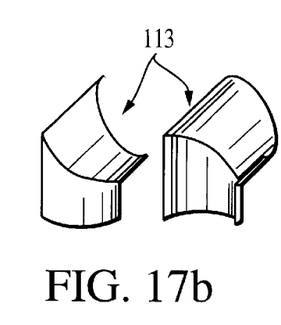
Figure 17C:
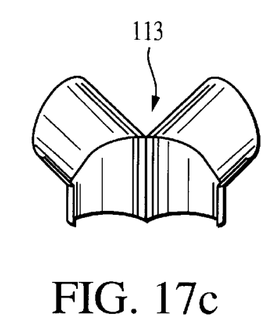
Figure 18A:
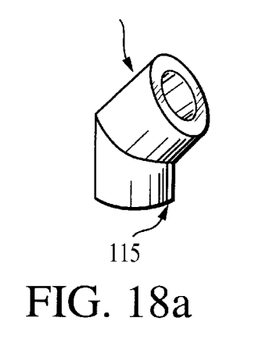
FIGS. 18a, b and c is the 45 degree elbow of FIG. 17a shown insulated of the invention of FIG. 1.
Figure 18B:
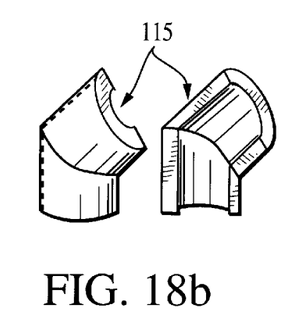
Figure 18C:
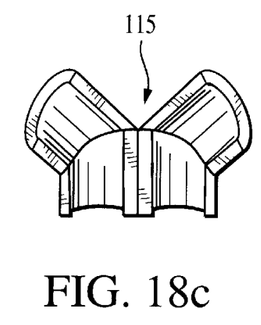

The coupling apparatus 102 shown in FIG. 13a consisting of ABS plastic coupling is employed to join two pieces of UN-insulated duct 70 together and in FIG. 13b ABS plastic coupling 104 used to join two pieces of insulated duct 18 together. Shown in FIGS. 14a–d are UN-insulated take off 106, insulated take off 108, UN-insulated take off 106 is shown in FIG. 14b in two halves for the ease of manufacturing and shipping, and in FIG. 14d insulated take off 108 shown in two halves 48 for the ease of manufacturing and shipping. FIGS. 15a–c is insulated end boot 110, insulated end boot shown in two halves and hinged at the back for ease of manufacturing and shipping. FIGS. 16a–c is end boot 111 without insulation. There is shown in FIGS. 17a–c an UN-insulated 45 degree elbow 113 with UN-insulated 45 degree elbow shown in two halves and hinged at the back for ease of manufacturing and shipping. FIGS. 18a–c is as FIG. 17 insulated elbow 115.

Figure 19A:
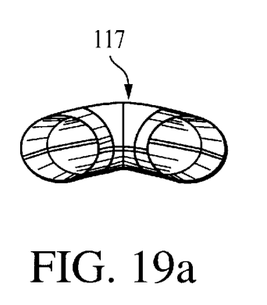
FIGS. 19a, b and c is an UN-insulated 90 degree elbow shown in a, b, and c shown fully assembled in two halves and shown hinged at the back for use with the invention of FIG. 1.
Figure 19B:
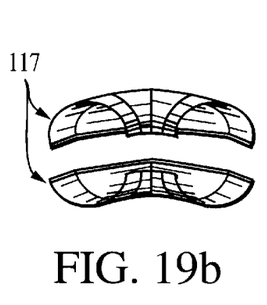
Figure 19C:
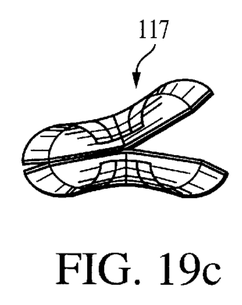
Figure 20A:
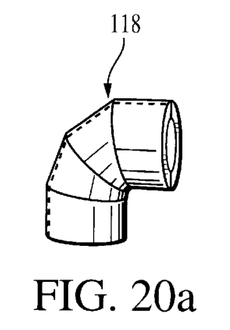
FIGS. 20a, b and c is the 90 degree elbow of FIG. 19 shown insulated.
Figure 20B:
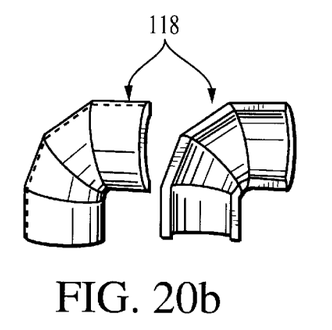
Figure 20C:
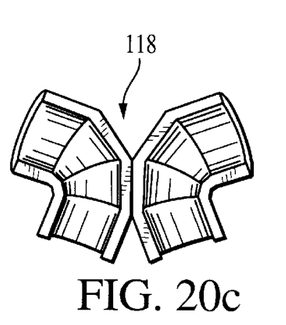
Figure 21A:
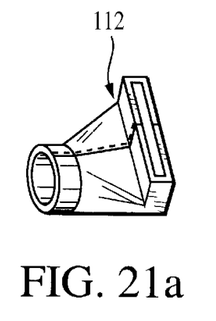
FIGS. 21a, b and c shows an insulated angle boot shown in two halves fully assembled and hinged at the back for ease.
Figure 21B:
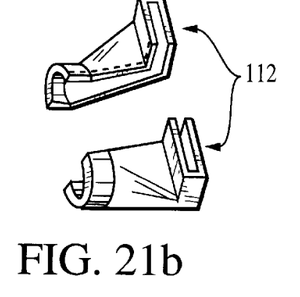
Figure 21C:
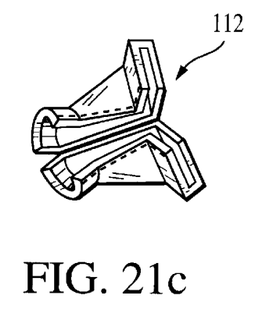
Figure 22A:
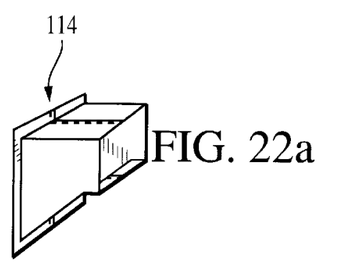
FIGS. 22a through d shows a main trunk device in the insulated and UN-insulated mode.
Figure 22B:
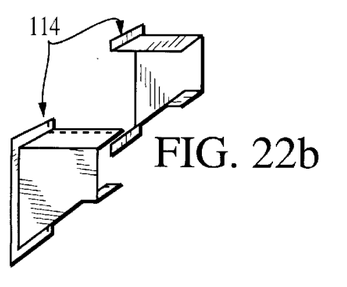
Figure 22C:
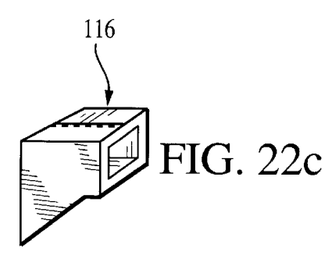
Figure 22D:
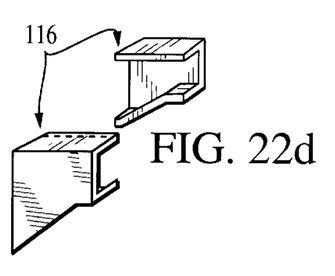

Referring to FIGS. 19a–c is an UN-insulated 90 degree elbow 117 shown in two halves and hinged at the back for ease of manufacturing and shipping. FIGS. 20a–c is as FIG. 19 insulated 90 degree elbow 118, and FIGS. 21a–c is insulated angle boot 112 shown in two halves and hinged at the back for ease of manufacturing and shipping. There is shown in FIGS. 22a–d a main UN-insulated trunk take off 114, either field fabricated or manufactured, and main insulated trunk take off 116.

The takeoffs, typically called fittings, used with this duct are also ABS plastic and would pre-insulated injection molded. The fitting configurations are very similar to the metal fittings used today, the only major difference is the way they would be joined to the main trunk ducts. Typically a location for each take off would be marked on the duct whether it be round or a square hole and the duct cut with the Roto Zip to the proper configuration. A take off would have two parts; one female, one male. The female part would be mounted on the inside of the duct with ABS glue applied to the inside part of the flange that would come in contact with the inside part of the duct. At the same time the outside part of the take off would have glue applied to the face of the flange and to the inside part of the take off. Both flanged pieces would "sandwich" the duct and the contact made between the male and female parts of the take off would be glued to one another to complete the water proof bond. The same scenario would be held true for all takeoffs regardless of the take off used.

The present invention also includes a method of forming by cutting and sizing pre-insulated duct by the following steps. Pre-insulated duct is made from two ⅛" sheets of ABS plastic glued on either side of 1" sheet of rigid fiberglass insulation using 3M super 77 adhesive.

The advantages of the present invention are as follows; material for forming the main duct panel is manufactured in 4'×8' sheets, already insulated and ready to cut to size to install. This duct has a much higher R value eliminating unnecessary heat loss/gain as the duct is run through unconditioned spaces throughout a building. The duct according to the present invention is completely impervious to water. Unlike conventional sheet metal duct work, wherein rusting of metal duct is commonplace due to damp conditions or central humidification units installed in the duct that drip water or malfunction as a function of time, the present invention is essentially moisture free. In conventional duct work, typically a duct rusts from the inside out and usually goes unnoticed until the rust penetrates through the duct.

With the present invention the duct work fits the first try. Duct fabricated in the field eliminates the need for unnecessary labor off the job site. All duct and takeoffs are made on the job site to fit the job the first time, and any size duct, offset, or take off is readily fabricated. According to the present invention, duct components are held together with ABS glue making the joints waterproof, extremely strong, and fast. Furthermore, the present invention is well suited for humidification. The duct, being water proof, is perfect for the acceptance for a more aggressive means of humidification and also more precise moisture distribution through the conditioned space. Typically the average humidification systems fall far short of the capacity needed to satisfy a space. Duct is completely sound proof unlike its metal counterpart. ABS duct is time proven; it is currently installed in practically every automobile duct system world wide, and operates at approximately the same temperature as the average home furnace/air conditioner. Temperature range is @ 35 F. to 200 F., equal to that of a car.

Method for Joining the Duct Together

The duct is joined together by extruded ABS plastic shapes 10' long. These shapes are then glued into the positions for which they are intended. These shapes make up the majority of the ones needed to fabricate the main trunk lines.

Examples of prior art are as follows:

A typical method for installing a section of metal duct to one another is as follows: First section of duct is wrapped with vinyl backed fiberglass duct wrap and then hung from the floor joists using metal strap hangers and sheet metal screws installed with a screw gun. The next 4' section that is to be butted up to the piece previously installed also has to be wrapped with insulation, all holes cut into it in the right locations, and more metal hangers screwed to the joists ready to accept the duct. The insulation typically is "peeled back" 6 inches on either end of the ducts to be joined so you can see the metal slip joint. The duct is then fit into the 'slip' connection and the metal drive cleats are hammered onto the slides of the duct to lock the sections together. The hangers are secured to the duct with more screws. The insulation is then folded back to its original position and duct tape is applied to both insulating surfaces to provide a moisture proof barrier. Next, holes for branch ducts must be cut and takeoffs installed in the main duct as each piece is installed. This is because it is nearly impossible to cut holes with sheet metal snips in confined areas such as the spaces between floor joists or the sides of duct with many obstacles in the way, making the layout of branch duct critical.

Pre-Insulated Duct

One method for installing pre-insulated duct is as follows: The first piece of duct is hung from the floor joists with ABS perforated hanging stock. The hanging stock is nailed to the floor joists in strips long enough to reach the sides of the duct. The duct coupling is then cut to lengths and glued to the ends of the duct. Another set of hangers is nailed into place on the floor joists. Glue is applied to the accepting side of the duct coupling and to the inside and outside edges of the next piece of duct. The duct is pushed into place and held for a few seconds while the glue sets. The hangers are glued to the duct and allowed to set a few seconds also.

The advantages to this are as follows:
1. Ease of simplified installation.
2. Holes are cut into the duct by using a Roto Zip (an electric tool used to cut sheet rock). Hole locations are no longer critical, holes are cut into duct after trunk is completely installed. Roto Zip tool can easily cut holes in the top of the duct or in the sides in confined spaces. Waste of time and material is eliminated.
3. Fighting with insulation and duct tape is eliminated.
4. Hangers do not penetrate the vapor barrier causing sweating of exposed metal parts in the cooling mode.
5. All insulation is completely sealed against moisture and fiberglass fibers cannot become airborne within the duct unlike metal duct or duct board.

Takeoffs and Branch Ducts

The takeoffs, commonly called fittings, used with this duct are also ABS plastic and would pre-insulated injection molded. The take off configurations are very similar to the metal fittings used today, the only major difference is the way they would be joined to the main trunk ducts.

Typically a location for each take off would be marked on the duct whether it be round or a square hole and the duct cut with the Roto Zip to the proper configuration.

Referring to FIG. 8 take-off 80 would have two parts; one female 68, one male 69. The female part would be mounted on the inside of the duct with ABS glue applied to the inside part of the flange that would come in contact with the inside part of the duct. At the same time the outside part of the take off would have glue applied to the face of the flange and to the inside part of the take off. Both flanged pieces would "sandwich" the duct and the contact made between the male and female parts of the take off would be glued to one another to complete the water proof bond. The same scenario would be held true for all takeoffs regardless of the take off used.

After the first take off is installed, a coupling typically would be next. The coupling is installed simply by applying glue to outside mating surface of the take off and to the inside cavity of the coupling and pushing the coupling on to the take off and holding the light pressure for a few seconds until the glue sets. The next step is to install a length of pre-insulated round pipe. Glue is applied to the inside cavity of the coupling and to the inside and outside end of the round duct. The duct is firmly pushed into the coupling and the glue is allowed to set. A perforated ABS strap hanger is in place ready to accept the weight of this duct.

It should be noted that the locking device on the round duct is not impervious to moisture, rather it is a simple device for the ease of holding the duct together. To make the joint water tight, glue would be applied to the length of the locking device and the two halves of said device pushed together. These surfaces form a continuous plastic mold from the inside of the pipe, such that the edge of fiberglass is not exposed. Next would be another coupling installed in the same manner as described previously. The "end boot" would be installed on the end of the run. This would be glued in the same way as the pipe and takeoffs above. The square end of the end boot would protrude through the floor of the space to be conditioned and a typical floor register would be installed.

The same methods would be used throughout the rest of the branch duct installation with the only variations being the use of a different type of take off fitting or the use of a 90 or a 45 degree fitting to make a turn or offset. These would be also glued in place with couplings glued to either end. Also if the duct were to run overhead to the ceiling register the installation would be the same, just the end fitting would change.

The other variation is the use of "flex duct". It is widely used now, and comes insulated in 25' lengths. This can be used in place of or in conjunction with any branch duct described above. Typically it is slipped over the round duct and duct tape is applied to the end of the flex and to the end of the round duct. A simple transition fitting would be used ere.

Accessories

The access door 66, (access means) is a very important accessory to the "Black Duct" system. It allows access to any part of the duct system for cleaning, retrieving toys, installing hard to reach takeoffs (by cutting the holes from the inside), testing airflow, checking humidity, and general inspection. These insulated access doors can also be installed after the main trunk line is put up. The properties of this material allow for a wide range of accessories.

Some other advantages to this duct system are that the same metal grills and registers can be used. ABS duct has a smooth interior surface which allows for improved air flow design.

Referring to the shortcomings of the prior art, the UN-insulated duct trunk and fittings shown are almost impractical due to the lack of strength of the duct and therefore limits the use of such duct, unless the duct sizes are small in size. They are shown for the purpose of showing inter changeability with the present invention.

Typically the "return air" duct has traditionally been UN-insulated and is simply carrying conditioned air back to the furnace/air conditioning unit to be re-circulated back into the space. All UN-insulated duct can be fabricated and installed in the same manner as the insulated duct. However, it is more advantageous to use all insulated duct for both the feed and return duct systems to minimize the heat loss/gain as the conditioned air travels within the duct in an unconditioned space. In a typical duct system of today the return duct is usually not insulated probably due to the cost of the labor to wrap and install the insulated duct. The reason for the split round pipe is to accommodate shipping. Many more pieces of round duct pipe can be fit into a box if the long edges are slipped into the cavity of another.

The split or hinged fittings are shown that way for the ease of manufacturing the injection molded fitting. It is presumed this would be the most cost effective and proper way for manufacturing these fittings. Again from a warehousing and shipping standpoint, these fittings can be packed many more to a box than the metal ones that come assembled and take up huge amounts of warehouse and truck space.

What is claimed is:

1. An insulated air duct apparatus for transferring a volume of fluid in said duct apparatus without employing external insulation or structural support members, otherwise required to support and insulate such a duct apparatus, comprising:
   a) a plurality of at least two insulated lightweight duct modules each duct module comprising duct walls comprising a plurality of at least four duct panels joined by corner connectors wherein said duct panels comprise an internal insulation layer comprising rigid fibrous glass sandwiched between an inner and an outer reinforced moisture proof facing sheet having inherent structural strength such that each duct module is self supporting;
   b) access means for providing access to interior spaces of said duct panel comprising an insulated access door associated with a duct wall of said air duct module and comprising two parts, one part female having a flange, one part male having a flange whereby;
      i) said female part would be mounted on the inner surface of a duct wall by attaching a surface of said flange to an inner facing sheet of the duct wall; and
      ii) said male part would be mounted on the outer surface of a duct wall by attaching a surface of said flange to an outer facing sheet of the duct wall;
   c) transition means provided for permitting fluid to communicate between air duct system components comprising insulated take-off apparatus wherein said take off apparatus associates with said duct wall and comprises two parts, one part female having a flange, one part male having a flange whereby;
      i) said female part would be mounted on the inner surface of said duct wall by attaching a surface of the flange for contacting the inner facing sheet of the duct wall; and
      ii) said male part would be mounted on the outer surface of said duct wall with by attaching a surface of the flange for contacting the outer facing sheet of the duct wall thereby connecting the air duct modules to component members for in situ coupling of pre insulated air duct apparatus components together with pre-insulated take-off connectors.

2. The duct system of claim 1 wherein said transition means comprises at least one access hole for providing a rectangular access for interconnecting one or more duct modules having a rectangular cross section to rectangular takeoffs, of pre-insulated injection molded construction; whereby both flanged parts would "sandwich" the duct and the contact made between the male and female parts of the take off would be attached to one another to complete the water proof bond.

3. The duct system of claim 2 wherein said access hole provides a round access for interconnecting one or more duct modules having a rectangular cross section to round take-offs and sealably interconnects one or more insulated round pipes to an air duct module with leak proof connections without employing conventional fittings.

4. The duct system of claim 1 wherein said transition means connects with an inner wall of the access port for sealably interconnecting said duct modules for providing structural support for said duct modules and for forming an enclosed, self supported duct system with leak proof connections without employing conventional fittings whereby both flanged parts would "sandwich" the duct and the contact made between the male and female parts of the take off would be attached to one another to complete a water proof bond.

5. The duct system of claim 1 wherein each panel member comprises a plurality nonmetallic sheets on exterior surfaces of the intermediate insulation means comprising rigid fibrous glass board (RFGB) with reinforced facing in combination with reinforced aluminum foil/kraft (FRK) facing for providing lateral planar strength in combination with a moisture barrier and forming a thermally and acoustically insulated air duct system.

6. The duct system of claim 5 wherein each panel member provides includes a Fiberglas duct panel having inherent flexural rigidity in combination with superior thermal value.

7. The duct system of claim 1 wherein said transition means comprise; a supply trunk line, adjustable take off, field fabricated supply plenum used as a take off assembly, extruded corner member, and mounting flange, UN-insulated return duct trunk line, UN-insulated take-off, insulated round duct coupling, insulated round duct, insulated round duct coupling, insulated end boot, UN-insulated round duct, UN-insulated end boot, round take off collar for insulated or UN-insulated round duct, volume damper, typical insulated flex duct found in use in the field today, insulated angle boot, and field fabricated 90 degree turn.

* * * * *